March 17, 1942.  J. B. PETERSON  2,276,334
MERCURIAL BAROMETER
Filed Aug. 23, 1940
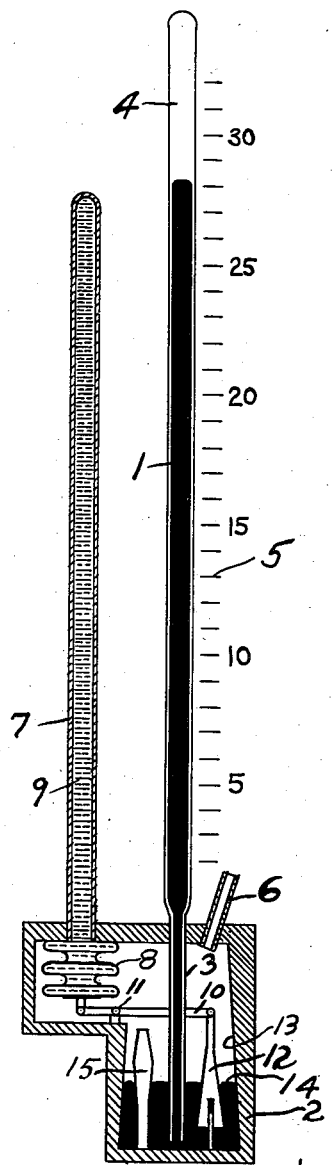
JOHN B. PETERSON
Inventor Patented Mar. 17, 1942

2,276,334

UNITED STATES PATENT OFFICE 2,276,334

MERCURIAL BAROMETER

John B. Peterson, Bethesda, Md.

Application August 23, 1940, Serial No. 353,875

1 Claim. (Cl. 73—4)

(Granted under the act of March 3, 1883, as amended April 30, 1928; 370 O. G. 757)

This invention relates to improvements in mercurial barometers, particularly to mechanisms for compensating for temperature variations.

This compensation or correction is accomplished by automatic adjustment of the horizontal surface area of the mercury in the cistern. A temperature operated tapered plug in a tapered cistern will, if properly designed as outlined in this specification, meet the several requirements for an instrument of this type.

With the foregoing and other objects in view, the invention consists in the construction, combination and arrangement of parts hereinafter described and illustrated in the drawing, in which:

The figure shows a preferred instrument. 1 is the mercury which extends from cistern 2 up into tube 3. Above the mercury in the top of the tube there is a vacuum space 4. 5 is a scale alongside tube 3. The reading on this scale opposite the top of the mercury column is the pressure indication of the instrument. Air pressure is transmitted to the cistern 2 through connection nipple 6.

The compensation chamber 7 and bellows 8 are filled with liquid 9, which expands the bellows as a function of the temperature. An increase in temperature turns lever 10 on fixed pivot 11, causing tapered plug 12 to rise, thereby decreasing the horizontal surface area 14 of mercury in the cistern and causing the scale value to remain constant for changing temperatures.

At 15 is shown a gravity plug whose area is a function of the earth's gravitational force at the location where the barometer is used.

In the design of the tapered cistern and tapered plug, it is necessary that the following three requirements be satisfied:

(1) The horizontal surface area 14 of mercury 1 within the tapered wall 13 of cistern 2 for temperature $t$ must be $$A = \frac{as}{1 + \alpha t - s}$$

where $A$ = the net horizontal surface area of mercury in the cistern.
$a$ = the horizontal surface area of mercury in the tube
$s$ = the scale shortening factor
$\alpha$ = the overall temperature coefficient of the incompensated barometer.
$t$ = the temperature in degrees centigrade.

(2) The equation of requirement (1) must be satisfied for all cistern mercury levels. That is the surface area 14 for a constant temperature must not change with changes in mercury level. This is accomplished by making the cross-sectional area taper 13 of the cistern 2 and the cross-sectional area taper of the plug 12 constant and equal.

(3) Holding a constant air pressure in the cistern 2, as the temperature increases the tapered plug 12 must rise at a rate which will drop the level of mercury in the cistern 2 just fast enough so that the level of mercury in the tube 3 will remain fixed. To accomplish this, the cross-sectional area of the plug 12 at the surface 14 of the mercury 1 must be proportional to the pressure indication of the instrument plus a constant. This constant is approximately equal to the depth of mercury in the cistern 2 when the air pressure in the cistern 2 is zero.

Although in this specification the term "barometer" is used, it should be understood that the claim applies equally well to liquid manometers. Usually a barometer with a vacuum above the top of the mercury column can be used as a manometer if the top of the tube is opened and connected to the lower pressure, and the cistern is connected to the higher pressure.

Other modifications and changes in the number and arrangement of the parts may be made by those skilled in the art without departing from the nature of the invention, within the scope of what is hereinafter claimed.

The invention described herein may be manufactured and/or used by or for the Government of the United States of America for governmental purposes without the payment of any royalties thereon or therefor.

Having thus set forth and disclosed the nature of this invention, what is claimed is:

A fixed-cistern liquid barometer, comprising a tube, a cistern into which said tube extends, a scale along said tube, a liquid in said tube and said cistern, a tapered plug dipping into said cistern, said tapered plug being adjustable, and temperature actuated means to automatically adjust said tapered plug to provide temperature compensation.

JOHN B. PETERSON.